United States Patent
Allen et al.

(10) Patent No.: US 9,984,417 B1
(45) Date of Patent: May 29, 2018

(54) SYSTEM AND METHOD TO DETERMINE INSURANCE MITIGATION ACTIONS BASED ON INFORMATIC DATA

(71) Applicant: United Services Automobile Association, San Antonio, TX (US)

(72) Inventors: Michael J. Allen, San Antonio, TX (US); Ramsey Devereaux, San Antonio, TX (US); Spencer Read, Helotes, TX (US); David S. Franck, San Antonio, TX (US); Teddy J. Voutour, Holotes, TX (US); William Chandler, San Antonio, TX (US); Michael P. Burns, San Antonio, TX (US); Kathleen L. Swain, Peoria, AZ (US); Cleburne R. Burgess, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 114 days.

(21) Appl. No.: 14/278,202

(22) Filed: May 15, 2014

Related U.S. Application Data

(60) Provisional application No. 61/948,192, filed on Mar. 5, 2014, provisional application No. 61/943,906, filed
(Continued)

(51) Int. Cl.
*G06Q 40/00* (2012.01)
*G06F 9/44* (2018.01)
(Continued)

(52) U.S. Cl.
CPC ............................... *G06Q 40/08* (2013.01)

(58) Field of Classification Search
None
See application file for complete search history.

(56) References Cited

U.S. PATENT DOCUMENTS

| 5,182,705 A | 1/1993 | Barr et al. |
| 5,235,507 A | 8/1993 | Sackler et al. |

(Continued)

FOREIGN PATENT DOCUMENTS

| EP | 722145 A1 | 7/1996 |
| WO | 2013036677 A1 | 3/2013 |

OTHER PUBLICATIONS

T. Sanidas et al., U.S. Appl. No. 61/800,561, filed Mar. 15, 2013, Drawings, 9 pages.
(Continued)

*Primary Examiner* — Jason Borlinghaus
(74) *Attorney, Agent, or Firm* — Eric L. Sophir; Dentons US LLP

(57) ABSTRACT

A computer device and method for processing risk or loss related data to determine insurance mitigation actions. Informatic data is received for an insured property from one or more informatic sensor devices associated with the insured property. Analysis is performed on the received informatic data to determine one or more risk conditions relating to the insured property. A mitigation report is generated based upon the determined one or more determined risk conditions which identifies one or more mitigation actions to be taken by an insured to reduce risks and the potential for future losses to the insured property.

20 Claims, 4 Drawing Sheets

Related U.S. Application Data on Feb. 24, 2014, provisional application No. 61/943,901, filed on Feb. 24, 2014, provisional application No. 61/943,897, filed on Feb. 24, 2014, provisional application No. 61/926,532, filed on Jan. 13, 2014, provisional application No. 61/926,534, filed on Jan. 13, 2014, provisional application No. 61/926,541, filed on Jan. 13, 2014, provisional application No. 61/926,536, filed on Jan. 13, 2014, provisional application No. 61/926,095, filed on Jan. 10, 2014, provisional application No. 61/926,098, filed on Jan. 10, 2014, provisional application No. 61/926,091, filed on Jan. 10, 2014, provisional application No. 61/926,093, filed on Jan. 10, 2014, provisional application No. 61/926,114, filed on Jan. 10, 2014, provisional application No. 61/926,103, filed on Jan. 10, 2014, provisional application No. 61/926,111, filed on Jan. 10, 2014, provisional application No. 61/926,108, filed on Jan. 10, 2014, provisional application No. 61/926,123, filed on Jan. 10, 2014, provisional application No. 61/926,121, filed on Jan. 10, 2014, provisional application No. 61/926,119, filed on Jan. 10, 2014, provisional application No. 61/926,118, filed on Jan. 10, 2014, provisional application No. 61/866,779, filed on Aug. 16, 2013.

(51) Int. Cl.
*G06F 17/50* (2006.01)
*G06Q 40/08* (2012.01)

(56) References Cited

U.S. PATENT DOCUMENTS

| | | | |
|---|---|---|---|
| 5,325,291 A | 6/1994 | Garrett et al. | |
| 5,526,609 A | 6/1996 | Lee et al. | |
| 5,724,261 A | 3/1998 | Denny et al. | |
| 5,960,338 A | 9/1999 | Foti | |
| 6,029,141 A | 2/2000 | Bezos et al. | |
| 6,049,773 A | 4/2000 | McCormack et al. | |
| 6,526,807 B1 | 3/2003 | Doumit et al. | |
| 6,686,838 B1 | 2/2004 | Rezvani et al. | |
| 6,766,322 B1 | 7/2004 | Bell | |
| 6,826,607 B1 | 11/2004 | Gelvin et al. | |
| 7,203,654 B2 | 4/2007 | Menendez | |
| 7,624,069 B2 | 11/2009 | Padgette | |
| 7,716,076 B1 | 5/2010 | Block et al. | |
| 7,949,548 B2 | 5/2011 | Mathai et al. | |
| 8,041,636 B1 | 10/2011 | Hunter et al. | |
| 8,106,769 B1 | 1/2012 | Maroney et al. | |
| 8,271,308 B2 | 9/2012 | Winkler | |
| 8,635,091 B2 | 1/2014 | Amigo et al. | |
| 8,650,048 B1 | 2/2014 | Hopkins, III et al. | |
| 8,731,975 B2 | 5/2014 | English et al. | |
| 8,760,285 B2 | 6/2014 | Billman et al. | |
| 8,924,241 B2 | 12/2014 | Grosso | |
| 9,613,523 B2 | 4/2017 | Davidson et al. | |
| 9,710,858 B1 | 7/2017 | Devereaux et al. | |
| 2002/0007289 A1 | 1/2002 | Malin et al. | |
| 2002/0032586 A1 | 3/2002 | Joao | |
| 2002/0035528 A1 | 3/2002 | Simpson et al. | |
| 2002/0116254 A1 | 8/2002 | Stein et al. | |
| 2002/0129001 A1 | 9/2002 | Levkoff et al. | |
| 2003/0040934 A1 | 2/2003 | Skidmore et al. | |
| 2004/0019507 A1 | 1/2004 | Yaruss et al. | |
| 2004/0034657 A1 | 2/2004 | Zambo et al. | |
| 2004/0172304 A1 | 9/2004 | Joao | |
| 2005/0055248 A1 | 3/2005 | Helitzer et al. | |
| 2005/0055249 A1* | 3/2005 | Helitzer | G06Q 40/08 705/4 |
| 2005/0128074 A1 | 6/2005 | Culpper et al. | |
| 2005/0251427 A1 | 11/2005 | Dorai et al. | |
| 2006/0052905 A1 | 3/2006 | Pfingsten et al. | |
| 2007/0118399 A1 | 5/2007 | Avinash et al. | |
| 2007/0150319 A1 | 6/2007 | Menendez | |
| 2007/0161940 A1 | 7/2007 | Blanchard et al. | |
| 2007/0174467 A1 | 7/2007 | Ballou et al. | |
| 2008/0033847 A1 | 2/2008 | McIntosh | |
| 2008/0065427 A1 | 3/2008 | Helitzer et al. | |
| 2008/0114655 A1 | 5/2008 | Skidmore | |
| 2008/0154851 A1 | 6/2008 | Keneflick et al. | |
| 2008/0154886 A1 | 6/2008 | Vicino | |
| 2008/0306799 A1 | 12/2008 | Sopko, III et al. | |
| 2009/0006175 A1 | 1/2009 | Maertz | |
| 2009/0119132 A1 | 5/2009 | Bolano et al. | |
| 2009/0216349 A1 | 8/2009 | Kwon et al. | |
| 2009/0265193 A1 | 10/2009 | Collins et al. | |
| 2009/0265207 A1 | 10/2009 | Johnson | |
| 2009/0266565 A1 | 10/2009 | Char | |
| 2011/0043958 A1 | 2/2011 | Nakamura et al. | |
| 2011/0137885 A1 | 6/2011 | Tracy et al. | |
| 2011/0161117 A1 | 6/2011 | Busque et al. | |
| 2011/0295624 A1* | 12/2011 | Chapin | G06Q 40/08 705/4 |
| 2012/0028835 A1 | 2/2012 | Borg et al. | |
| 2012/0046975 A1 | 2/2012 | Stolze | |
| 2012/0116820 A1 | 5/2012 | English et al. | |
| 2012/0176237 A1 | 7/2012 | Tabe | |
| 2012/0290333 A1 | 11/2012 | Birchall | |
| 2012/0311053 A1 | 12/2012 | Labrie et al. | |
| 2012/0323609 A1 | 12/2012 | Fini | |
| 2013/0040836 A1 | 2/2013 | Borg et al. | |
| 2013/0144858 A1 | 6/2013 | Schnabolk et al. | |
| 2013/0317732 A1 | 11/2013 | Borg et al. | |
| 2014/0067137 A1 | 3/2014 | Amelio et al. | |
| 2014/0108275 A1 | 4/2014 | Heptonstall | |
| 2014/0114893 A1 | 4/2014 | Helitzer et al. | |
| 2014/0132409 A1 | 5/2014 | Billman et al. | |
| 2014/0136242 A1* | 5/2014 | Weekes | G06Q 40/08 705/4 |
| 2014/0142989 A1 | 5/2014 | Grosso | |
| 2014/0278573 A1 | 9/2014 | Cook | |
| 2014/0279593 A1 | 9/2014 | Pershing | |
| 2014/0327995 A1 | 11/2014 | Panjwani et al. | |
| 2014/0358592 A1 | 12/2014 | Wedig et al. | |
| 2014/0375440 A1 | 12/2014 | Rezvani et al. | |
| 2015/0006206 A1 | 1/2015 | Mdeway | |
| 2015/0025915 A1 | 1/2015 | Lekas | |
| 2015/0221051 A1 | 8/2015 | Settino | |
| 2016/0055594 A1 | 2/2016 | Emison | |

OTHER PUBLICATIONS

T. Sanidas et al., U.S. Appl. No. 61/800,561, filed Mar. 15, 2013, Specification, 19 pages.
United States Notice of Allowance issued in U.S. Appl. No. 14/251,411 dated Sep. 13, 2017.
United States Non-Final Office Action issued in U.S. Appl. No. 14/251,411 dated Apr. 19, 2017.
United States Final Office Action issued in U.S. Appl. No. 14/251,411 dated Sep. 24, 2015.
United States Non-Final Office Action issued in U.S. Appl. No. 14/273,918 dated Mar. 7, 2017.
United States Final Office Action issued in U.S. Appl. No. 14/273,918 dated Sep. 30, 2015.
United States Non-Final Office Action issued in U.S. Appl. No. 14/273,918 dated Jan. 16, 2015.
United States Final Office Action issued in U.S. Appl. No. 14/278,182 dated Aug. 25, 2017.
United States Non-Final Office Action issued in U.S. Appl. No. 14/278,182 dated Mar. 28, 2017.
United States Final Office Action issued in U.S. Appl. No. 14/278,182 dated Dec. 1, 2016.
United States Non-Final Office Action issued in U.S. Appl. No. 14/278,182 dated Apr. 8, 2016.
United States Final Office Action issued in U.S. Appl. No. 14/278,182 dated Jun. 9, 2015.

(56) References Cited

OTHER PUBLICATIONS

United States Non-Final Office Action issued in U.S. Appl. No. 14/278,182 dated Dec. 12, 2014.
United States Notice of Allowance issued in U.S. Appl. No. 14/303,382 dated Aug. 15, 2017.
United States Final Office Action issued in U.S. Appl. No. 14/303,382 dated Mar. 8, 2017.
United States Non-Final Office Action issued in U.S. Appl. No. 14/303,382 dated Jun. 30, 2016.
United States Final Office Action issued in U.S. Appl. No. 14/303,382 dated Nov. 19, 2015.
United States Non-Final Office Action issued in U.S. Appl. No. 14/324,546 dated Jul. 3, 2017.
United States Final Office Action issued in U.S. Appl. No. 14/324,546 dated Dec. 29, 2016.
United States Non-Final Office Action issued in U.S. Appl. No. 14/342,546 dated May 26, 2016.
United States Final Office Action issued in U.S. Appl. No. 14/324,546 dated Sep. 23, 2015.
United States Final Office Action issued in U.S. Appl. No. 14/324,759 dated Jan. 11, 2016.

\* cited by examiner

SYSTEM AND METHOD TO DETERMINE INSURANCE MITIGATION ACTIONS BASED ON INFORMATIC DATA

CROSS REFERENCE TO RELATED APPLICATIONS

This application claims priority to U.S. Patent Application Ser. Nos. 61/886,779 filed Aug. 16, 2013; 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for managing insurance and related products and services, and more particularly, to providing sensor or other data captured informatics from insured property to third parties to mitigate present or future risks or losses.

BACKGROUND OF THE INVENTION

Smart home functionality is a maturing space, but the opportunity for insurance companies remains largely untapped. Currently, there are few useful early warning and loss mitigation systems that actually save costs and time for both the property owner and insurance company alike. For instance, currently, homeowners insurance claim events are detected by the homeowner, who contacts the insurance company to inform them that there has been a loss. However, the loss could be mitigated with automated warning and detection systems that interface with the insurance company systems. For example, homeowners may not become aware of minor to medium hail damage to their roofs until such time as that damage leads to water damage to the interior or exterior of the home. If they could be made aware of such loss events earlier and then take corrective actions, then the increased damage could have been mitigated or avoided.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, provided is a computer device and method for processing risk or loss related data to determine mitigation actions. Informatic data is received for insured property from one or more informatic sensor devices associated with the insured property. Analysis is performed on the received informatic data to determine one or more risk conditions relating to the insured property. An insurance mitigation report is generated based upon the determined one or more determined risk conditions which identifies one or more mitigation actions to be taken by an insured to reduce risks and potential future losses to insured property.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
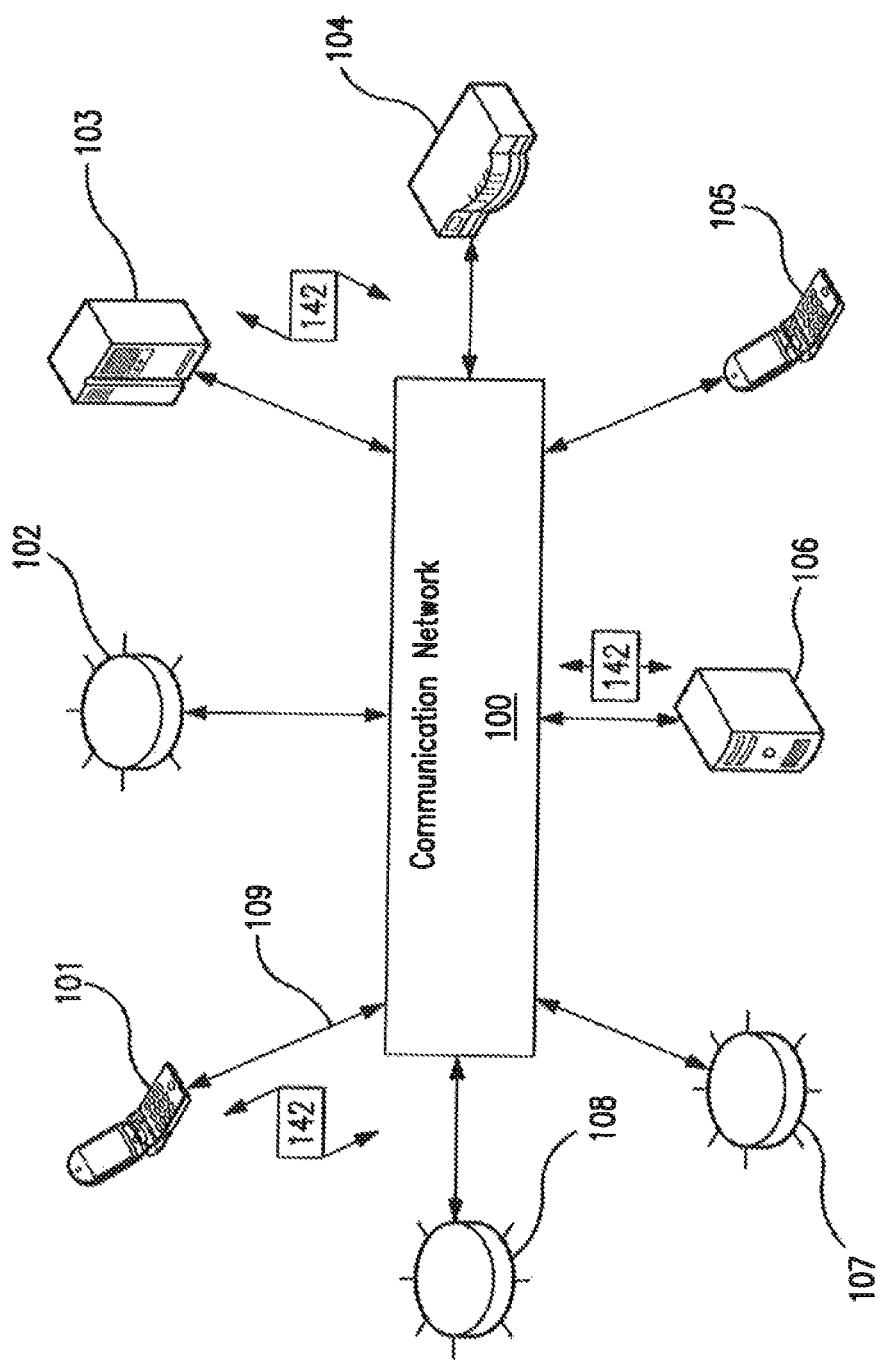
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety.

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the term "insurance policy" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
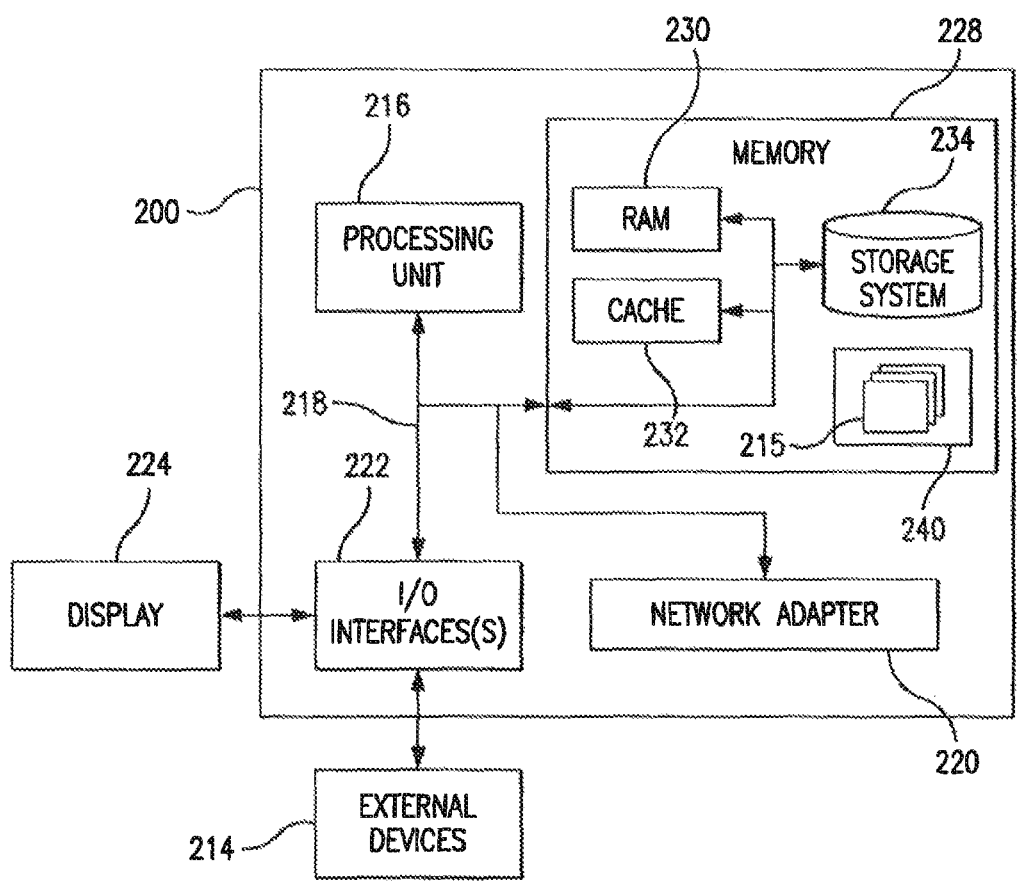
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as insured property analyzer module 306 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
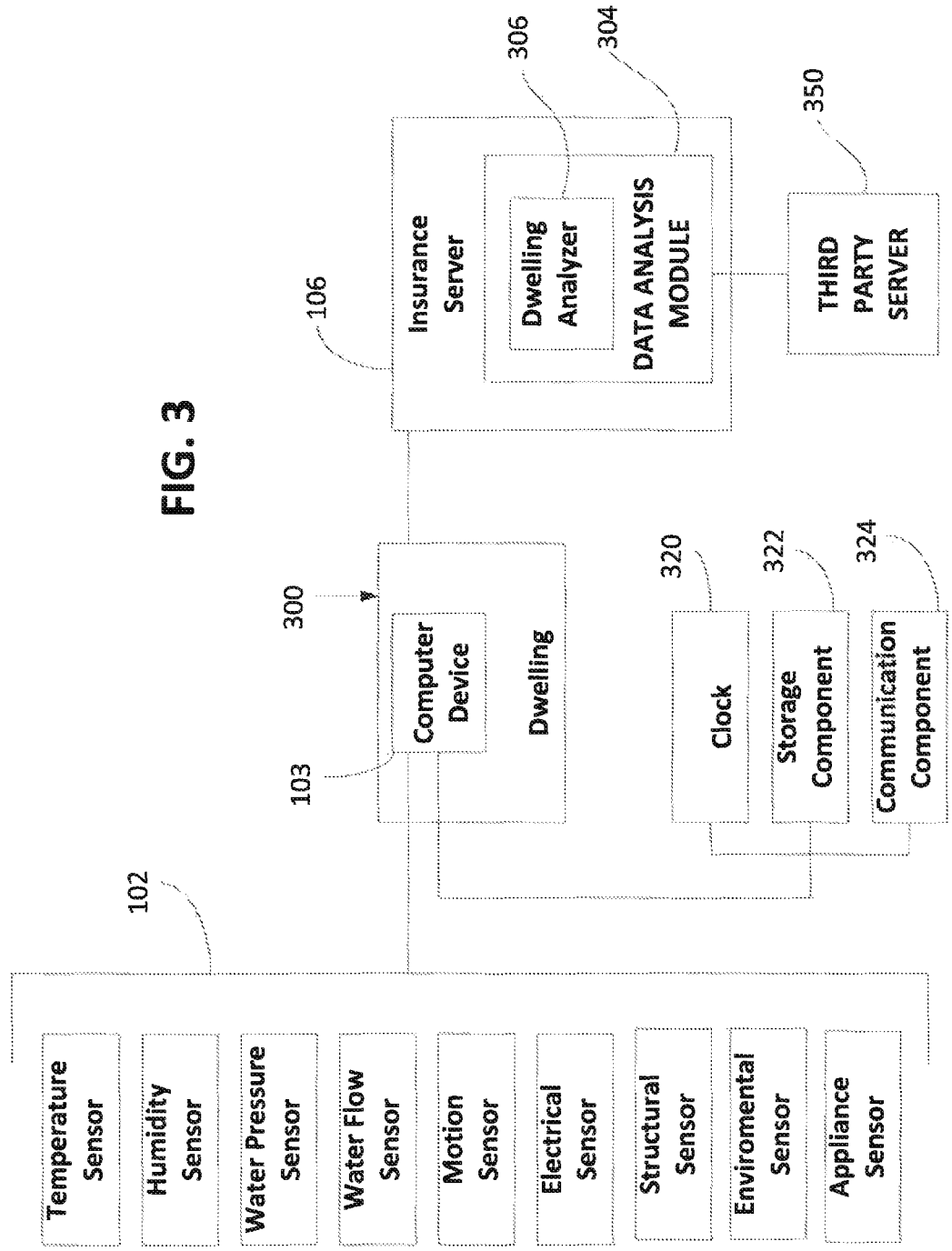
FIG. 3 is a block diagram of a insured property from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of insured property structure (e.g., residential, commercial, retail, municipal, etc.) in which the capture and analysis of sensor data (102) is useful for the reasons at least described below. Insured property 300 preferably includes a computing device 103 for capturing data from a plurality of sensors 102 which capture data regarding various aspects of insured property 300, as further described below. It is to be understood insured property computing device 103 may be located in any location, and its position is not limited to the example shown.

Computing device 103 is preferably configured and operational to receive (capture) data from various sensors 102 regarding certain aspects (including functional and operational) of insured property 300 (described further below) and transmit that captured data to a remote server 106, via network 100. It is noted device 103 may perform analytics regarding the captured sensor data regarding insured property 300 and/or the remote server 106, preferably located or controlled by an insurance company/carrier, may perform such analytics, as also further described below. It is also to be understood in other embodiments, data from sensors 102 may be transmitted directly to remote server 106, via network 100, thus either obviating the need for insured property computing device 103 or mitigating its functionality to capture all data from sensors 102.

In the illustrated embodiment of FIG. 3, insured property computing device 103 is shown coupled to various below described informatic sensor types 102, each configured and operational to capture a certain type of informatic data, as discussed below. Although various sensor types 102 are described below and shown in FIG. 3, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Temperature sensor—configured and operational to preferably detect the temperature present at the insured property 300. For example, the temperature may rise and fall with the change of seasons and/or the time of day. Moreover, in the event of a fire, the temperature present at the insured property 300 may rise quickly—possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the insured property. Thus, probes placed at various locations (e.g., in the basement, on the various levels of a multi-level insured property 300, in different rooms that receive different amounts of sun, etc.), in order to obtain an accurate picture of the temperature present at the insured property. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the insured property 300. Humidity sensor may comprise the humidity-detection hardware, or may employ one or more remote probes, which may be located inside and/or outside the insured property 300. Humidity readings from one or more locations inside and/or outside the insured property could thus be recorded by device 103.

Water Sensor(s)/Water pressure sensor(s)—configured and operational to preferably monitor water related conditions, including (but not limited to): the detection of water and water pressure detection, for instance in the plumbing system in the insured property 300. With regards to a water pressure sensor, it may have one or more probes attached to various locations of the insured property's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure (and water flow) that is present in the plumbing system at various points in time.

Water flow sensor—configured and operational to preferably monitor water flow rate in the plumbing system in the insured property 300. Water flow sensor may have one or more probes attached to various locations of the insured property's 300 plumbing, such as faucets, showerheads and appliances, and thus water flow sensor 103 may measure and/or record the amount of water flowing through the insured property's 300 water supply system. Thus, device 103 may record the water flow that is present in the plumbing system at various points in time.

Wind speed sensor—configured and operational to record the wind speed present at the insured property 300. For example, one or more wind sensors may be placed outside the insured property 300, at the wind speed and/or direction may be recorded at various points in time. Device 103 may record these wind speed and/or wind direction readings. The wind speed may be used by an analysis model for various purposes.

Motion sensor—configured and operational to sense motion in the insured property 300 to which device 300 is attached. Typically, insured property's 300 do not move significantly, except in the event of a catastrophe. Motion sensor may indicate that the insured property 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the insured property.

Optical (e.g., Camera/Imaging) sensor—configured and operational to allow viewing of the interior or exterior of the insured property 300 on which device 300 is attached or located. This sensor may be configured to allow access during certain triggered events. This may also include pre and post images of any event that would trigger systematic change detection that is able to compare, contrast and extrapolate differences in images.

Electrical system sensor/analyzer configured and operational to assess the condition of the insured property's 300 electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. Still other types of electrical measurements could be determined include how energy is used and at what times of day it is used, etc. Any type of data about the insured property's 300 electrical system could be captured by device 103. An analysis model could use the information about electrical energy in various ways.

Positional sensor configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While as insured property 300 normally does not move, positional sensor may allow device 103 to be recovered in the event of a catastrophe. For example, if as insured property 300 explodes, or is otherwise catastrophically damaged, device 103 may be propelled to an unknown location. Positional sensor may indicate the geographical area of as insured property 300 which an analysis model could use in various ways. Positional sensor may record the position of device 103, which device 103 could communicate to an external source, thereby allowing device 103 to be found.

Structural sensor—configured and operational to preferably detect various structural conditions relating to insured property 300. A structural sensor may comprise detection hardware, or may employ one or more remote probes, which may be located inside and/or outside the insured property 300. Conditions recorded by structural sensor may include (but are not limited to) the condition of the wall structure, floor structure, ceiling structure and roof structure of insured property 300, which may be achieved via: load bearing detectors; components which measure the slope of a floor/wall/ceiling; carpet conditions (e.g., via nano sensor) or any another components functional to detect such conditions. Structural readings from one or more locations inside and/or outside the insured property 300 could thus be recorded by device 103 and used by an analysis model in various ways.

Environmental Sensor—configured and operational to preferably detect various environmental conditions relating to insured property 300. An environmental sensor may comprise detection hardware, or may employ one or more remote probes, which may be located inside and/or outside the insured property 300. Conditions recorded by an environmental sensor may include (but are not limited to) the air quality present in insured property 300, the presence of mold/bacteria/algae/lead paint or any contaminant adverse to human health (whether airborne or attached to a portion of the structure of insured property 300). Such environmental readings from one or more locations inside and/or outside the insured property 300 could thus be recorded by device 103 and used by an analysis model in various ways.

Appliance Sensor—configured and operational to preferably detect various operating parameters relating to appliances within as insured property 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc) electrical generator system, pool filtration and heating system, garage door openers, sump pump and water well system, septic tank system, garage door opener, etc. An appliance sensor may comprise detection hardware, or may employ one or more remote probes, which may be located inside and/or outside the insured property 300 functional to detect certain operating parameters of appliances. Operating parameters detected by an appliance sensor 300 may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). Such appliance readings from one or more insured property appliances could thus be recorded by device 203 and used by an analysis model in various ways.

With exemplary informatic sensors 102 identified and briefly described above, and as will be further discussed below, it is to be generally understood informatic sensors 102 preferably record certain informatic data parameters relating to products and services provided by an insurance carrier, such as USAA, to reduce risks and the potential for future losses to the insured property. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.); camera sensors such as those consisting of camera standalone devices, or by integrating into existing camera devices in an insured property 300. It is additionally to be understood and appreciated that sensors 102 can be networked into a central computer hub (e.g., device 103) in an insured property to aggregate collected sensor data packets. Aggregated data packets can be analyzed in either a insured property computer system (e.g., device 103) or via an external computer environment (e.g., server 106). Additionally, it is to be understood data packets collected from sensors 102 can be aggregated in insured property computing device 103 and sent as an aggregated packet to server 106 for subsequent analysis whereby data packets may be transmitted at prescribed time intervals (e.g., a benefit is to reduce cellular charges in that some insured property's 300 may not have Internet access or cellular service is backup when insured property Internet service is nonfunctioning).

In accordance with an illustrated embodiment, in addition to the aforementioned, the sensors 102 being utilized relative to insured property 300, insured property computing device 103 may additionally be coupled to a Clock 320 which may keep track of time for device 103, thereby allowing a given item of data to be associated with the time at which the data was captured. For example, device 103 may recurrently capture readings of temperature, wind speed, humidity, appliance operating times, etc., and may timestamp each reading. The time at which the readings are taken may be used to reconstruct events or for other analytic purposes, such as those described below. For example, the timestamps on wind speed readings taken during a hurricane may allow it to be determined, after the hurricane has occurred, how quickly the wind speed rose in the vicinity of the insured property 300.

A storage component 322 may further be provided and utilized to store data readings and/or timestamps in device 103. For example, storage component 322 may comprise, or may otherwise make use of, magnetic or optical disks, volatile random-access memory, non-volatile random-access memory, or any other type of storage device. There may be sufficient data storage capacity to store several hours or several days worth of readings. For example, the severe part of a hurricane might last for half a day, a full day, or several days. Storage component 322 might have sufficient storage capacity to allow twelve or more hours of readings to be stored, thereby allowing forensic reconstruction of how the hurricane affected the insured property 300 during the full time that the insured property 300 was experiencing the hurricane's impact.

A communication component 324 may further be provided and utilized to communicate recorded information from insured property computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from insured property computing device 103 to learn about risks and needs and other analytics relative to insured property 300 in which device 103 is located. Communication component 324 may initiate communication sessions with server 106. Or, as another example, server 106 may contact device 103, through communication component 324, in order to receive data that has been stored by device 103. Additionally, data from sensors 102, clock 320 and/or storage component 322 may be communicated directly to server 106, via network 100, thus obviating or mitigating the need for insured property computing device 103.

In the example of FIG. 3, communication component 324 (which is shown, in FIG. 3, as being part of, or used by, insured property computing device 103) communicates data to server 106. Server 106 may comprise, or otherwise may cooperate with, a data analysis module 304, which may analyze data in some manner. Data analysis module 304 may comprise various types of sub-modules, such as insured property analyzer 306. In general, insured property analyzer 306 may perform an analysis of collected data regarding various attributes of insured property 300, such as, for example, but not limited to, structural condition of the insured property 300 and environmental conditions detected in the vicinity of the insured property 300. In various embodiments of the present invention, insured property analyzer 306 may perform a post hoc analysis, such as that used to understand the details of how an insured property 300 was damaged or destroyed during a hurricane, a fire, etc. Moreover, insured property analyzer 306 may analyze data to assess the risk of destruction and/or damage that has not yet happened, enhance loss mitigation for an insurance carrier (e.g., push data to one or more third parties in real-time from insured property 300 for maximizing preventable losses), determine insured property damage, determine risk situations present, determine repair needs for insured property 300, and the like.

In accordance with an illustrated embodiment, insurance server 106 is configured and operational to establish computer network communication with one or more third party servers 350 so as to transmit the aforementioned informatic data captured from informatic sensors 102 to the one or more third party servers 350. As discussed further below, the third party servers 350 are preferably associated with a third party (relative to the insured and the insured's insurance company) configured and operational to perform analytical analysis on the informatic data from one or more insured properties 300 to mitigate risks associated with present or future insurance claims associated with the one or more insured properties 300. For instance, such a third party, may include (but is not to be understood to be limited to):

architects, engineers, government officials, emergency responders, independent contractors, appliance server vendors, and the like.

Figure 4:
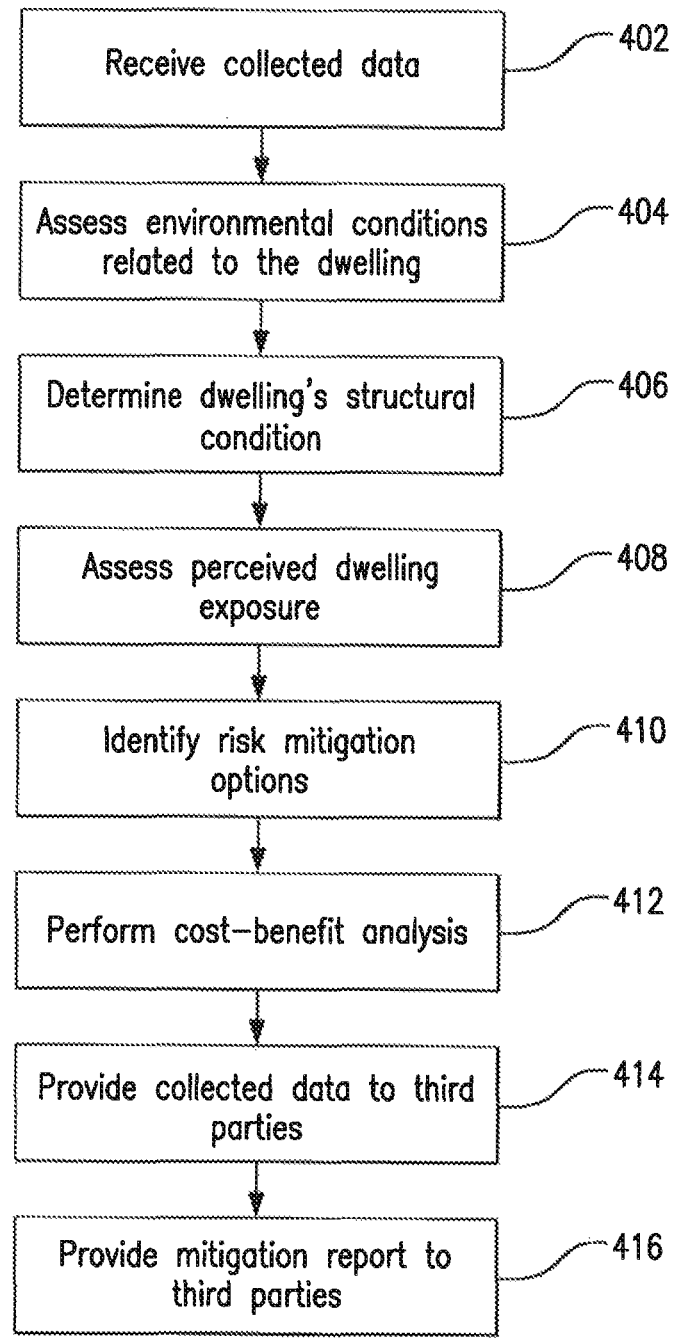
FIG. 4 is a flow diagram of operational steps of the insured property analyzer module of FIG. 3 in accordance with an illustrated embodiment.

FIG. 4 shows, in the form of a flow chart, exemplary operational steps of the insured property analyzer 306. Before turning to description of FIG. 4, it is noted that the flow diagram shown therein is described, by way of example, with reference to components shown in FIGS. 1-3, although these operational steps may be carried out in any system and are not limited to the scenario shown in the aforementioned figures. Additionally, the flow diagram in FIG. 4 shows an example in which operational steps are carried out in a particular order, as indicated by the lines connecting the blocks, but the various steps shown in these diagrams can be performed in any order, or in any combination or sub-combination.

With reference to FIG. 4, at 402, insured property analyzer 306 preferably collects data from sensors 102. In an embodiment of the present invention, this step may involve computing device 103 periodically contacting (via network 100), at prescribed time intervals, data analyzer component 304 running on server 106 to send accumulated data. In an alternative embodiment, contact between the insured property computing device 103 and insured property analyzer 306 may be initiated when the insured property analyzer 306 contacts the insured property computing device 103. Following the initial contact, insured property analyzer 306 may receive data from the insured property computing device 103. It is to be understood data packets collected from sensors 102 can be aggregated in insured property computing device 103 and send as an aggregated packet to insured property analyzer 306 for subsequent analysis. In another illustrative embodiment, insured property analyzer 306 may receive informatic data from more than one insured property in a geographic area so as to determine an insurance risk associated with the geographic area.

At 404, insured property analyzer 306 preferably processes the informatics data collected by a plurality of sensors 102 to assess environmental conditions related to the insured property 300. Environmental conditions may include, but are not limited to: temperature conditions, wind conditions, air quality present in the insured property 300, humidity present in the insured property 300, and so forth. In various embodiments of the present invention, the plurality of sensors 102 measuring and/or collecting environmental informatics data may include one or more of temperature sensors, humidity sensors, sound sensors, wind speed sensors, environmental sensors, and so on.

As previously indicated, insured property analyzer 306 may perform a post hoc analysis. For example, if a hurricane strikes the area in which the insured property 300 is located, insured property analyzer 306 may analyze the wind speed, temperature, and movement at various points in time. If the insured property 300 is damaged, it may be possible to determine, based on the analysis of collected informatics data, the actual mechanism by which the insured property 300 was damaged, and/or how long the insured property 300 withstood the hurricane-force winds. Various types of informatics data may be analyzed by insured property analyzer 306 to learn, in some detail, about the event that damaged the insured property 300. This analysis may be used by insured property analyzer 306 to estimate future risks.

In addition to performing a post hoc analysis, insured property analyzer 306 may be configured to analyze information about environmental conditions that are present at the insured property 300 in advance of any actual damage. For example, insured property analyzer 306 may analyze the wind speed at the insured property 300, in order to get a picture of the average wind speed over a period of few months. If insured property analyzer 306 detects a trend toward a higher wind speed, this fact may suggest an increased likelihood of damage (e.g., trees may be more likely to fall in the presence of higher magnitude winds). As another example, insured property analyzer 306 could analyze humidity readings, where a trend toward higher humidity may indicate an increased likelihood of mold damage.

In an embodiment of the present invention, insured property analyzer 306 may collect data from more than one insured property in a geographic area to determine the general level of risk in the area. For example, insured property analyzer 306 may analyze the data from approximately ten houses in a particular geographic location to determine that average wind speed has been increasing over the past few years. As another example, insured property analyzer 306 may determine whether a particular geographic area in which the insured property 300 is located is prone to earthquakes based on recent seismic activity measured by various environmental sensors 102. An insurance company could use this information to mitigate future losses, as described below.

At 406, based on data collected from sensors 102 regarding insured property 300, insured property analyzer 306 preferably conducts an analysis to determine a structural condition of the insured property 300. For example, insured property analyzer 306 may determine whether harsh environmental conditions, such as hurricane, storm surge, earthquake, volcano, landslide, and the like, have affected structural integrity of the insured property 300. In addition to the above, some geographic regions commonly experience problems that cannot only be a nuisance to those living in the residence, but which can also affect the structural integrity of the insured property structure itself. For example, termites are just one type of insect that are known to infest and damage homes. Thus, insured property analyzer 306 may conduct an analysis to detect insect infestations within the insured property 300 structure. As yet another non-limiting example, in this step insured property analyzer 306 may detect a hole in the roof of the insured property 300 requiring immediate repair. In general, at 406, insured property analyzer 306 may analyze the collected data to determine whether insured property 300 and/or any of its components satisfy structural soundness requirements.

At 408, insured property analyzer 306 preferably assesses exposure of the insured property 300, for example, by identifying risks associated with one or more perils. As used herein, the term "peril" refers to a cause of loss. By way of example, such perils may include a natural disaster (e.g., a tornado, a hurricane, an earthquake, a flood, etc.), a man-made disaster (e.g. a release of hazardous material, gas pipe explosion, arson, etc.), and the like. In an embodiment of the present invention, insured property analyzer 306 preferably evaluates levels of exposure for each peril based on observed and/or historical informatics data. As an illustrative example, insured property analyzer 306 may determine estimated likelihood that a specified peril (e.g., a tornado) may occur in a specified geographical zone to cause a specified degree of damage (e.g., $10 million), based on environmental conditions analyzed by the insured property analyzer 306 at 404.

Next, at 410, insured property analyzer 306 preferably generates a mitigation report, which may include various risk mitigation options associated with the one or more perils identified at 408. The mitigation report may further include a current risk assessment, a future risk assessment, and repair recommendations if, for example, insured property analyzer 306 has determined (at 406) that structural integrity of the insured property 300 had been compromised or might be compromised in the future. For instance, if insured property analyzer 306 has detected a hole in the roof of the insured property 300, insured property analyzer 306 may recommend an immediate repair. As another risk mitigation option, based on the analysis performed at 404-408, insured property analyzer 306 may recommend constructing a reinforced section of the insured property 300 capable of withstanding one or more environmental conditions associated with the perceived exposure of the insured property. For instance, if insured property analyzer 306 has determined that a likelihood of tornado in the general vicinity of insured property 300 has increased then insured property analyzer 306 may recommend building a "safe room" within the insured property 300. A safe room may comprise a hardened structure specifically designed to provide protection to the insured property 300 occupants in extreme weather events, including tornadoes and hurricanes. Moreover, based on the analysis of the informatics data (i.e., wind analysis) insured property analyzer 306 may provide guidance to various third parties, such as but not limited to, architects, engineers, building officials, local officials, emergency managers, independent contractors, and prospective safe room owners, related to safe room construction options. Advantageously, the occupants of a safe room built in accordance with insured property analyzer's 306 guidance may have a very high probability of being protected from injury or death. Thus, insured property analyzer 306 may provide proactive and real-time management of loss minimization.

Optionally, at 412, insured property analyzer 306 may conduct a cost-benefit analysis related to various risk mitigation options. In an embodiment of the present invention, insured property analyzer 306 may perform evaluation of the maximum amount that likely would be owed in the event of a total loss for the insured property. This evaluation for a property may also be treated as an evaluation of the costs likely to be incurred in response to a particular loss event. For example, this valuation could be determined simply as the replacement cost of rebuilding or restoring an insured property that has been damaged or destroyed by a covered peril. It is noted that other types of analysis related to exposure of the insured property 300 may be made by the insured property analyzer 306 at 408. In addition, insured property analyzer 306 may automatically facilitate and/or determine the most cost efficient repair options, if immediate repairs are needed. For instance, insured property analyzer 306 may identify one or more vendors capable of performing the repairs related to the one or more risk mitigation options in the most-cost effective manner. In another illustrative embodiment, insured property analyzer 306 is configured and operational to determine pricing and/or other modifications to be made to an insurance policy for a insured property if the one or more mitigation actions are initiated by an insured.

At 414, insured property analyzer 306 may provide captured informatics data to third parties to mitigate future losses. Captured informatics data my include, but not limited to, historic and/or real time temperature measurements, wind measurements, air quality measurements, humidity measurements, and the like. Third parties that may be involved in mitigating risks associated with future losses may include, but not limited to, one or more vendors selected to perform the repairs related to the one or more risk mitigation options, other insurance companies (if, for example, reinsurance is identified as a risk mitigating option), various governmental entities that might provide funding/rebates for the performed repairs. For instance, occupants of the insured property 300 may be interested in applying for a safe room rebate program. In this case, insured property analyzer 306 may provide collected and/or analyzed data to Federal Emergency Management Agency (FEMA), for example, if FEMA is the government entity providing such rebates. In an embodiment of the present invention, insured property analyzer 306 may be integrated with one or more third party information systems, such as National Emergency Management Information System, for exchanging information.

At 416, insured property analyzer 306 may optionally provide the generated mitigation report to the aforementioned third parties. As previously indicated the mitigation report may include various risk mitigation options (such as repair recommendations) associated with the one or more perils identified at 408, a current risk assessment, a future risk assessment, as well as cost-benefit analysis and the damage history associated with the insured property 300. The mitigation report may further include additional guidance related to, for example, recommended repairs based on the determined insured property's 300 structural condition. It is to be also understood and appreciated that the insurance server 106 may be configured and operational to integrate with various third party information systems for sending such mitigation report and other information regarding mitigation of future losses.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer system for processing data, comprising:
   a memory configured to store instructions;
   a processor disposed in communication with the memory, wherein the processor upon execution of the instructions is configured to:
   receive a first set of informatic data for a plurality of properties comprising a first property from one or more informatic sensor devices associated with the plurality of properties, wherein the one or more informatic sensor devices are configured to collect information regarding a plurality of categories of property information;
   determine a first level of risk relating to the first property based on the first set of informatic data;
   determine a second category of property information associated with the first level of risk;
   identify a first informatic sensor device, wherein the first informatic sensor device is configured to collect information from the first property;
   upon determining that the second category of property information is among the plurality of categories of property information that the first informatic sensor device is configured to collect, generate and transmit a first instruction to the first informatic sensor device to collect data associated with the second category of property information from the first property, wherein the first instruction alters a frequency of data collection by the first informatic sensor device by commanding an immediate data collection;

receive a second set of informatic data from the first informatic sensor device, wherein the second set of informatic data is associated with the second category of property information for the first property;

determine a second risk level associated with the first property based on the second set of informatic data;

determine one or more mitigation actions associated with the first property based on the second set of informatic data and the second risk level;

generate and transmit a second instruction to the first informatic sensor device to display a notification comprising one or more mitigation actions to be taken for the first property;

transmit the first and the second set of informatic data to a third party server, wherein the third party server is associated with the one or more mitigation actions;

retrieve a first image associated with the first property, wherein the first image illustrates attributes associated with the first property prior to occurrence of any of the one or more mitigation actions;

generate and transmit a third instruction to a surveying instrument, wherein the third instruction is configured to request a second image associated with the first property illustrating attributes associated with the first property; and monitor the occurrence of any of the one or more mitigation actions by comparing the first and the second images.

2. A computer system as recited in claim 1, wherein the processor upon execution of the instructions is further configured to determine modifications to be made to an insurance policy associated with the first property if the one or more mitigation actions are initiated.

3. A computer system as recited in claim 1, wherein the processor is further configured to perform analysis includes performing a post hoc analysis to determine:
whether the first property is damaged; and
in response to the first property being damaged, how the first property was damaged.

4. A computer system as recited in claim 1, wherein the mitigation actions include determining repair needs for the first property.

5. A computer system as recited in claim 1, wherein the mitigation actions include maintenance needs for the first property.

6. A computer system as recited in claim 1, wherein the mitigation actions include determining environmental conditions relating to the first property.

7. A computer system as recited in claim 1, wherein the processor upon execution of the instructions is further configured to collect data from more than the first property in a geographic area to determine a risk associated with the geographic area.

8. A computer system as recited in claim 1, wherein the notification further identifies a risk assessment for the first property.

9. A computer system as recited in claim 1, wherein the notification further identifies repair recommendations for the first property.

10. A computer system as recited in claim 1, wherein the notification further identifies recommendation to contact one or more identified third parties.

11. A computer system as recited in claim 10, wherein the third party server includes one or more of an: architect; engineer; government official; emergency responder, building contractor; and appliance service vendor.

12. A computer system as recited in claim 1, wherein the processor upon execution of the instructions is further configured to perform, and generate, a cost benefit analysis regarding the notification and mitigation actions, wherein the cost benefit analysis is directed towards an insurance policy associated with the first property.

13. A computer system as recited in claim 1, wherein the processor upon execution of the instructions is further configured to perform evaluation of a maximum amount owed in an event of a total loss to the first property based at least in part upon the second set of informatic data.

14. A computer system as recited in claim 1, wherein the processor upon execution of the instructions is further configured to electronically transmit the notification to a predetermined third party.

15. A computer system as recited in claim 1, wherein the processor upon execution of the instructions is further configured to send data relating the notification of the second set of informatic data to a predetermined third party.

16. A computer system for processing data, comprising:
a memory configured to store instructions;
a processor disposed in communication with the memory, wherein the processor upon execution of the instructions is configured to:
receive a first set of informatic data for a plurality of properties comprising a first property from one or more informatic sensor devices associated with the plurality of properties, wherein the one or more informatic sensor devices are configured to collect information regarding a plurality of categories of property information;
determine a first level of risk relating to the first property based on the first set of informatic data;
determine a second category of property information associated with the first level of risk;
identify a first informatic sensor device, wherein the first informatic sensor device is configured to collect information from the first property;
upon determining that the second category of property information is among the plurality of categories of property information that the first informatic sensor device is configured to collect, generate and transmit a first instruction to the first informatic sensor device to collect data associated with the second category of property information from the first property wherein the first instruction alters a frequency of data collection for the first informatic sensor device by commanding an immediate data collection;
receive a second set of informatic data from the first informatic sensor device, wherein the second set of informatic data is only associated with the second category of property information for the first property;
determine a second risk level associated with the first property based on the second set of informatic data;
determine one or more mitigation actions associated with the first property based on the second set of informatic data and the second risk level;

generate and transmit a second instruction to the first informatic sensor device to display a notification comprising one or more mitigation actions to be taken for the first property;

transmit the first and the second set of informatic data to a third party server, wherein the third party server is associated with the one or more mitigation actions;

retrieve a first image associated with the first property, wherein the first image illustrates attributes associated with the first property prior to occurrence of any of the one or more mitigation actions;

generate and transmit a third instruction to a surveying instrument, wherein the third instruction is configured to request a second image associated with the first property illustrating attributes associated with the first property;

monitor the occurrence of any of the one or more mitigation actions by comparing the first and the second images; and establish computer network connection with one or more predetermined third parties to send data relating to at least one of the determined risk levels and data relating to the one or more mitigation actions to be taken.

17. A computer system as recited in claim 16, wherein the processor upon execution of the instructions is further configured to determine one of pricing and other modifications to be made to an insurance policy associated with the first property if the one or more mitigation actions are initiated.

18. A computer system as recited in claim 16, wherein the processor upon execution of the instructions is further configured to perform, and generate, a cost benefit analysis regarding the notification, wherein the cost benefit analysis is directed towards an insurance policy associated with the first property.

19. A non-transitory computer readable storage medium and one or more computer programs embedded therein, the computer programs comprising instructions, which when executed by a computer system, cause the computer system to:

receive a first set of informatic data for a plurality of properties comprising a first property from one or more informatic sensor devices associated with the plurality of properties, wherein the one or more informatic sensor devices are configured to collect information regarding a plurality of categories of property information;

determine a first level of risk relating to the first property based on the first set of informatic data;

determine a second category of property information associated with the first level of risk;

identify a first informatic sensor device, wherein the first informatic sensor device is configured to collect information from the first property;

upon determining that the second category of property information is among the plurality of categories of property information that the first informatic sensor device is configured to collect, generate and transmit a first instruction to the first informatic sensor device to collect data associated with the second category of property information from the first property wherein the first instruction alters a frequency of data collection by the first informatic sensor device by commanding an immediate data collection;

receive a second set of informatic data from the first informatic sensor device, wherein the second set of informatic data is associated with the second category of property information for the first property;

determine a second risk level associated with the first property based on the second set of informatic data;

determine one or more mitigation actions associated with the first property based on the second set of informatic data and the second risk level;

generate and transmit a second instruction to the first informatic sensor device to display a notification comprising one or more mitigation actions to be taken for the first property;

transmit the first and the second set of informatic data to a third party server, wherein the third party server is associated with the one or more mitigation actions;

retrieve a first image associated with the first property, wherein the first image illustrates attributes associated with the first property prior to occurrence of any of the one or more mitigation actions;

generate and transmit a third instruction to a surveying instrument, wherein the third instruction is configured to request a second image associated with the first property illustrating attributes associated with the first property; and monitor the occurrence of any of the one or more mitigation actions by comparing the first and the second images.

20. A computer system as recited in claim 16, wherein the processor upon execution of the instructions is further configured to determine modifications to be made to an insurance policy if the one or more mitigation actions are initiated.

* * * * *